United States Patent
Koneru et al.

(10) Patent No.: US 9,792,317 B2
(45) Date of Patent: Oct. 17, 2017

(54) ACCELERATED DATA INTEGRITY THROUGH BROKER ORCHESTRATED PEER-TO-PEER DATA SYNCHRONIZATION

(71) Applicant: KONY, INC., Orlando, FL (US)

(72) Inventors: Raj Kumar Koneru, Windermere, FL (US); Pattabhi Rama Rao Dasari, Hyderabad (IN); Prajakt Deshpande, Hyderabad (IN); Rajendra Komandur, Hyderabad (IN); Sriram Ramanathan, Lutz, FL (US); Srinivas Sesham, Orlando, FL (US); Matthew Terry, Celebration, FL (US); Matthew B. Trevathan, Roswell, GA (US); Sathyanarayana Vennapusala, Hyderabad (IN)

(73) Assignee: KONY, INC., Orlando, FL (US)

( * ) Notice: Subject to any disclaimer, the term of this patent is extended or adjusted under 35 U.S.C. 154(b) by 772 days.

(21) Appl. No.: 13/886,834

(22) Filed: May 3, 2013

(65) Prior Publication Data

US 2014/0330779 A1 Nov. 6, 2014

(51) Int. Cl.
| | | |
|---|---|---|
| G06F 7/00 | (2006.01) | |
| G06F 17/00 | (2006.01) | |
| G06F 17/30 | (2006.01) | |

(52) U.S. Cl.
CPC .. *G06F 17/30371* (2013.01); *G06F 17/30575* (2013.01); *G06F 17/30578* (2013.01)

(58) Field of Classification Search
None
See application file for complete search history.

(56) References Cited

U.S. PATENT DOCUMENTS

| | | | | |
|---|---|---|---|---|
| 8,381,232 B2 * | 2/2013 | Kudo | ................... | G06F 3/1204 710/15 |
| 2003/0078062 A1 * | 4/2003 | Burr | ................... | H04W 56/002 455/502 |
| 2003/0172113 A1 * | 9/2003 | Cameron | .......... | G06F 17/30179 709/204 |
| 2003/0220929 A1 * | 11/2003 | Tolpin | ................ | G06F 11/1446 |
| 2004/0230456 A1 * | 11/2004 | Lozier | .................. | G06F 19/322 705/2 |
| 2006/0173850 A1 * | 8/2006 | Auer | ................ | G06F 17/30356 |
| 2011/0137879 A1 * | 6/2011 | Dubey | .............. | G06F 17/30171 707/704 |
| 2012/0190339 A1 * | 7/2012 | Abe | ...................... | H04W 48/16 455/411 |

(Continued)

OTHER PUBLICATIONS

Microsoft Corporation, "How to Choose a Data Synchronization Technology—Offline & Collaboration", Oct. 2009, http://msdn.microsoft.com/en-us/sync/cc470041; 2 pages.

(Continued)

*Primary Examiner* — Jau-Shya Meng
(74) *Attorney, Agent, or Firm* — Andrew M. Calderon; Roberts Mlotkowski Safran Cole & Calderon, P.C.

(57) ABSTRACT

A method includes receiving a notification from a first device that a data record has been changed on the first device, and receiving a notification from a second device of an intent to change the data record on the second device. The method also includes instructing the second device to wait before changing the data record on the second device, and instructing the first device to synchronize the changed data record.

17 Claims, 7 Drawing Sheets

(56) References Cited

U.S. PATENT DOCUMENTS

2013/0218838 A1* 8/2013 Bevan .............. G06F 17/30129
707/626
2015/0220556 A1* 8/2015 Lunden ............ G06F 17/30174
707/618

OTHER PUBLICATIONS

Microsoft Corporation, "Introduction to Sync Framework Database Synchronization", 2010, http://msdn.microsoft.com/en-us/sync/bb887608; 6 pages.

* cited by examiner

ACCELERATED DATA INTEGRITY THROUGH BROKER ORCHESTRATED PEER-TO-PEER DATA SYNCHRONIZATION

FIELD OF THE INVENTION

The invention relates to data synchronization and, more particularly, to avoiding conflicts in data synchronization.

BACKGROUND OF THE INVENTION

With the increased availability, connectivity, and computing power of mobile devices, these devices have become the primary productivity tool of a mobile workforce. At the foundation of any productivity application on a mobile device is the ability to access, modify, and transmit information. Even with advances in connectivity, the ability to work disconnected (e.g., offline) remains a pertinent factor in maximizing the usefulness of mobile applications.

Enabling plural users to work offline with their mobile devices (e.g., sales representatives, field service workers, deliver personnel, etc.) may be accomplished using data synchronization with a master data repository to which the mobile devices of the plural users are intermittently connected. Each user may make updates to data locally on their mobile device while not connected to the master data repository (e.g., while working offline in the field), and then synchronize the changes to the master data repository at a later time when the mobile device is connected to the master data repository (e.g., at the end of the day). A conflict may occur, however, when two users working offline and independently of each other make changes to the same data record in the database, resulting in a collision when the varying changes are synchronized.

SUMMARY OF THE INVENTION

In a first aspect of the invention, a method of data synchronization includes receiving a notification from a first device that a data record has been changed on the first device, and receiving a notification from a second device of an intent to change the data record on the second device. The method also includes instructing the second device to wait before changing the data record on the second device, and instructing the first device to synchronize the changed data record.

In another aspect of the invention, there is a system for managing data synchronization. The system comprises a synchronization server comprising a broker that is adapted to: receive a notification from a first device that a data record has been changed on the first device; receive a notification from a second device of an intent to change the data record on the second device; send a message to the second device to wait before changing the data record on the second device; and send a message to the first device to synchronize the changed data record to one of a master data repository and the second device.

In yet another aspect of the invention, there is a computer system for managing data synchronization. The system comprises a CPU, a computer readable memory, and a computer readable storage media. The system further comprises first program instructions to monitor a change of a data record in a client database of a first mobile device. The computer system further comprises second program instructions to, based on the monitoring, instruct the first device to transmit the change of the data record to one of a master data repository and a second mobile device. The first and second program instructions are stored on the computer readable storage media for execution by the CPU via the computer readable memory. The master data repository includes a server database that includes the data record, and the second mobile device includes another client database that includes the data record.

In still another aspect of the invention, there is a method of managing data synchronization between a mobile device and a master data repository. The method includes receiving a notification from the mobile device that a data record has been changed on the mobile device, and determining a current connectivity status of the mobile device to the master data repository. The method also includes predicting a future connectivity status of the mobile device to the master data repository, and providing instructions to the mobile device regarding synchronizing the changed data record with the master data repository based on the determining and the predicting.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to data synchronization and, more particularly, to avoiding conflicts in data synchronization. In accordance with aspects of the invention, a data synchronization broker is made aware of all data record changes, or intent to change data records, by occasionally connected devices even when the full synchronization of data back to the master data repository is not immediately performed. In embodiments, the broker receives an indication from a first device of a change to a data record prior to the first device synchronizing the change to the master data repository. When a second device indicates a change to the same data record, the broker initiates corrective action to avoid a synchronization conflict based on predefined enterprise rules. The rules may include, but are not limited to, coordinating a peer-to-peer synchronization of the two changes between the first and second devices and subsequently having only one of the mobile devices synchronize both changes to the master data repository. In this manner, implementations of the invention significantly reduce the number of data collisions by using the broker to orchestrate the flow of information between clients and assist in peer-to-peer data synchronization when it is found to be mutually beneficial.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium may be any medium that can contain, store, communicate, or transport the program for use by or in connection with an instruction execution system, apparatus, or device. The computer-usable or computer-readable medium may be, for example, an electronic, magnetic, optical, electromagnetic, infrared, or semiconductor system, apparatus, or device.

Figure 1:
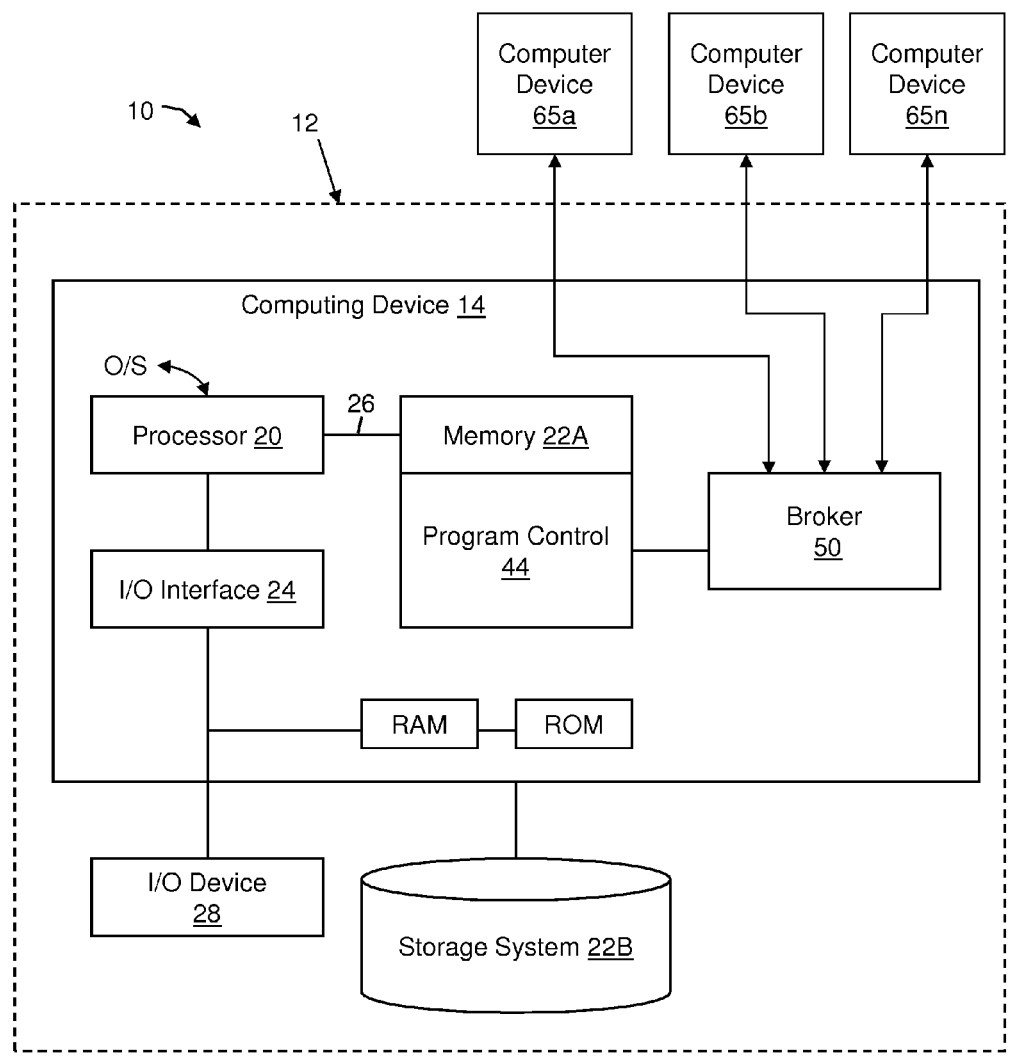
FIG. 1 is an illustrative environment for implementing the processes in accordance with aspects of the invention.

FIG. 1 shows an illustrative environment 10 for managing the processes in accordance with the invention. The environment 10 includes a server 12 or other computing system. The server 12 can be any server which is synchronizing data. For example, the server 12 can be a synchronization server for a business enterprise that stores data in a storage system 22B, which data may be accessed and modified by users of user computer devices 65a, 65b, . . . 65n. In embodiments, the server 12 can be a standalone server, which implements the processes of the present invention within a networking environment. That is, the server 12 and/or processes performed by the server 12 can be integrated into the networking environment of any enterprise.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65a-n, etc.) using any type of communications link. The storage system 22B can store data such as one or more databases which can be maintained, for example, by an enterprise administrator.

The processor 20 executes computer program code (e.g., program control 44), which can be stored in the memory 22A and/or storage system 22B. In embodiments, the program control 44 controls a broker 50 which comprises an application that is adapted to perform one or more of the processes described herein. The broker 50 can be implemented as one or more program code in the program control 44 stored in memory 22A as separate or combined modules. Additionally, the broker 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

The program code can include computer program instructions which are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium may be, for example an electronic, magnetic, optical, electromagnetic, infrared, and/or semiconductor system. More specific examples (a non-exhaustive list) would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Figure 2:
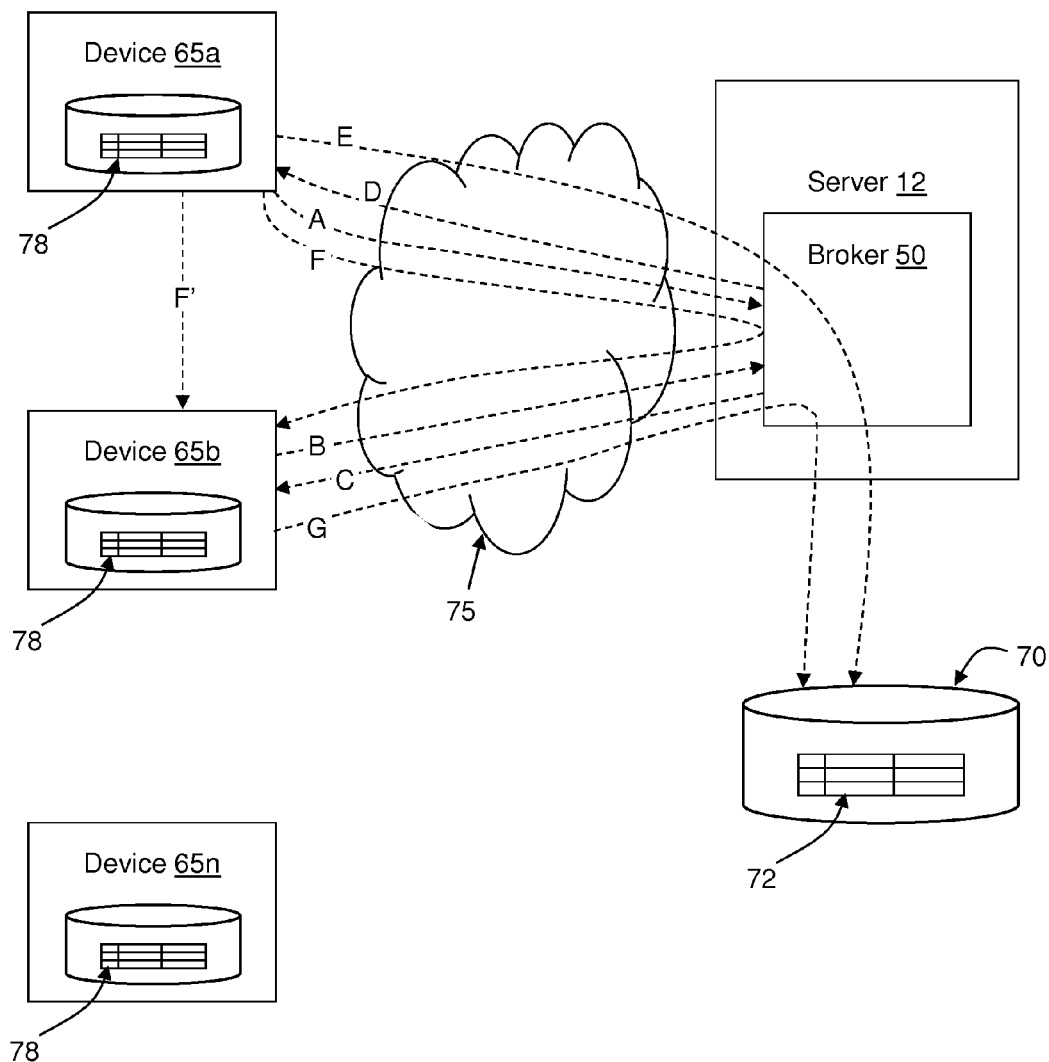
FIG. 2 shows a block diagram and exemplary operation of a system in accordance with aspects of the invention.

FIG. 2 shows a block diagram of an exemplary system in accordance with aspects of the invention. In embodiments, the system includes the server 12 that runs the broker 50. The server 12 is in communication with a master data repository 70 that may comprise, for example, a server database 72 (e.g., SQL Server, etc.) stored at storage system (e.g., storage system 22B as in FIG. 1). The server 12 is also periodically (e.g., intermittently, occasionally, etc.) in communication with a plurality of devices 65a-n via a network 75. The devices 65a-n may comprise any number and type of mobile computing device, including but not limited to: a smartphone, tablet computer, laptop computer, personal digital assistant, etc. The network 75 may comprise one or more types of communication network, including wired, wireless, and combinations thereof, and may utilize any number of known or later developed communication protocols.

In embodiments, each device 65a-n comprises a client database 78 (e.g., SQL Server Compact, etc.) that can be synchronized with the server database 72. Each device 65a-n may also comprise a processor that executes an application (e.g., a mobile enterprise application, etc.) that facilitates making local changes to the client database 78 and synchronizing the local changes with the server database 72. In accordance with aspects of the invention, the server 12 and the devices 65a-n are adapted to perform synchronization functions such as, for example: over the air (OTA) synchronization; bi-directional synchronization; change tracking (e.g., incremental download and/or incremental upload); and conflict detection and resolution.

To illustrate aspects of the present invention, the following exemplary operation is described with reference to FIG. 2. It should be noted that this exemplary operation is not limiting, and that other operations may be performed within the scope of the invention. Moreover, any one or more of the functions and/or steps described with respect to FIGS. 3-8 may be used with the system and operation described with respect to FIG. 2.

In the system and exemplary operation depicted in FIG. 2, a user of the first device 65a has modified a data record locally (e.g., in the client database 78 on the first device 65a) but has not yet synchronized this change to the master data repository 70. There may be a number of reasons why the user has not yet synchronized the data to the master data repository 70. For example, the change to the data might be sufficiently large and/or the connection of the first device 65a to the server 12 may be sufficiently slow that synchronization is not possible or practicable. As another example, the first device 65a may have only an unsecure connection to the server 12 and enterprise rules may prohibit synchronizing over an unsecure connection. As yet another example, the user of the first device 65a may have opted to not start the synchronization process (e.g., did not manually start the synchronization process).

At step A, the first device 65a sends a message to the broker 50 indicating the change to the data record has taken place locally at the first device 65a, even though the first device 65a has not synchronized the change to the master data repository 70. In embodiments, the message is sent from the first device 65a to the broker 50 automatically (e.g., without user input) when the user makes the change to the data at the first device 65a. The message may be sent using any suitable and/or available communication channel, such as via network data, SMS (short message service), SIP (session initiation protocol), etc. In this manner, the broker 50 is immediately informed of the change to the data record prior to the change being synchronized to the master data repository 70.

At step B, a second device 65b contacts the server 12 and requests to access the same data record for changing it locally at the second device 65b, e.g., the second device 65b notifies the broker 50 of an intent to change the data record. Step B occurs after step A, e.g., at some time after the change made by the first device 65a, but prior to that change being synchronized from the first device 65a to the master data repository 70. In embodiments, the request from the second device 65b is passed to the broker 50, which checks the integrity of the data record against any changes made at the master data repository 70 and at any other mobile devices (e.g., first device 65a).

At step C, the broker 50 sends a message to the second device 65b indicating whether the particular data record has been modified (e.g., either at the server 12 or at another mobile device) during the time period since this data record was last synchronized between the master data repository 70 to the second device 65b. In the event that the particular data record requested by the second device 65b has not been modified since last synchronized between the master data repository 70 to the second device 65b, the broker 50 sends a message to the second device 65b indicating that the data record is 'clean.' This indicates that the copy of the data record in the client database at the second device 65b matches the data record at the master data repository 70 and that no other devices (e.g., devices 65a, 65n, etc.) have indicated a change to this data record. On the other hand, in the event that the particular data record requested by the second device 65b has been modified since last synchronized between the master data repository 70 to the second device 65b, the broker 50 sends a message to the second device 65b indicating that the data record is 'dirty.' In the example described in FIG. 2, the broker 50 determines that the first device 65a has modified the data record and consequently sends a message to the second device 65b that the data record is dirty.

A designation that the data record is dirty can exist under some circumstances in two cases. In a first case, the data record has been changed at the master data repository 70 since last being synchronized with the second device 65b. In a second case, the data record has been changed locally on another device (e.g., first device 65a) but has not yet been changed at the master data repository 70.

In the first case, the data is available to the second device 65b via the master data repository 70. Accordingly, in embodiments, the application running at the second device 65b may be programmed to display a warning notification to the user of the second device 65b that changing this particular data record locally at the second device 65b prior to a synchronization refresh with the master data repository 70 will result in a conflict. The application at the second device 65b can automatically initiate a synchronization refresh between the second device 65b and the master data repository 70 for this data record, e.g., to obtain the current data record from the master data repository 70 before the second device 65b attempts to make its further changes to the data record. Alternatively, the application at the second device 65b may prompt the user to manually execute a synchronization refresh from this data record based on one or more business rules predefined in the application. After the synchronization refresh is performed (e.g., automatically or manually), the application permits the second device 65b to make changes to the data record. In this manner, a conflict is avoided.

The second case for indicating that a data record is dirty occurs when the data record has been changed locally on another device, and this change has been reported to the broker 50, but the changed data record has not yet been provided to the master data repository 70. This is the case in the example thus far described with respect to FIG. 2, where the change to the data record currently only resides at the first device 65a but not yet at the master data repository 70. In this case, in embodiments, the broker 50 sends a notification to the first device 65a instructing the first device 65a to either perform a synchronization refresh with the master data repository 70 or perform a peer-to-peer synchronization with the second device 65b. This notification is depicted at step D in FIG. 2. The notification at step D may be sent using any suitable communication channel, such as via network data, push notification networks, SMS, SIP, a voice call with a pre-recorded message to the first device 65a, etc. In embodiments, step D comprises the broker 50 sending the notification via each available communication channel in a predefined order (e.g., data network first, SMS second, etc.) until the first device 65a acknowledges the notification or until all communication channels have been attempted and failed.

According to aspects of the invention, when the notification of step D is received at the first device 65a, the user of the first device 65a can elect to do one of: perform a synchronization with the master data repository 70 as depicted at step E; perform a peer-to-peer synchronization with the second device 65b as depicted at step F; or decline to perform any synchronization with the master data repository 70 or second device 65b.

For example, upon receipt of the notification from the broker 50 at step D, the user of the first device 65a may elect to perform a synchronization refresh with the master data repository 70 for the particular data record. In this manner, at step E, the changes to the data record that were made by the user of the first device 65a are communicated to the server 12 for updating the master data repository 70. After the master data repository 70 is updated with the changes to the data record from the first device 65a, the broker 50 sends a notification to the second device 65b that the data record has been changed at the master data repository 70. The second device 65b then treats this situation in the same manner as the first case of a dirty data record as already described herein, e.g., by automatically performing or prompting the user of the second device 65b to manually perform a synchronization refresh with the master data repository 70 for the particular data record, after which the user of the second device 65b is free to apply their change to the data record. In this manner, changes to the same data record from both the first device 65a and the second device 65*b* are accommodated while avoiding a conflict (e.g., without a collision occurring).

As another example, upon receipt of the notification from the broker 50 at step D, the user of the first device 65*a* may elect to perform a peer-to-peer synchronization with the second device 65*b*, e.g., as depicted at step F. In embodiments, the peer-to-peer synchronization comprises the first device 65*a* transmitting its change in the data record (e.g., the change made by the user of the first device 65*a*) to the second device 65*b*. The transmitting at step F may be performed from the first device 65*a* to the second device 65*b* indirectly via the broker 50 (as indicated by arrow F in FIG. 2), or directly from the first device 65*a* to the second device 65*b* (as indicated by arrow F' in FIG. 2).

When the peer-to-peer synchronization at step F occurs via the broker 50, the first device 65*a* may transmit the changed data record in one or more messages to the broker 50 using any suitable communication channel (e.g., plural SMS messages). Subsequently, the broker 50 may transmit the changed data record to the second device 65*b* in one or more messages using any suitable communication channel (e.g., network data). In embodiments, the broker 50 is programmed with business logic to decide which type of communication channel to use between each of the first device 65*a* and the second device 65*b* based on, for example, at least one of: available channels; latency/bandwidth of the available channels; size of the changed data record; and security constraints associated with the data record.

When the peer-to-peer synchronization at step F' occurs directly from the first device 65*a* to the second device 65*b*, the first device 65*a* may transmit the changed data record to the second device 65*b* using any suitable peer-to-peer link between the devices, such as near field communication (NFC), Bluetooth, WiFi, etc. In a particular embodiment, the broker 50 promotes the first device 65*a* to act as a temporary server with the second device 65*b* as the client. In this manner, the first device 65*a* is promoted to act as a server for this data record only, and is demoted after it provides the data record to the second device 65*b*.

In embodiments, the broker 50 is programmed to instruct the devices 65*a* and 65*b* to test the latency and/or bandwidth between the three entities, e.g., between the first device 65*a* and the broker 50, between the second device 65*b* and the broker 50, and between the first device 65*a* and the second device 65*b*. The decision to make the peer-to-peer synchronization at step F/F' may be made automatically by the broker 50 and may be based on, for example, the available connections (e.g., network data, cellular, SMS, WiFi, etc.) between the entities 50, 65*a*, and 65*b*, latency/bandwidth of the available connections, and/or also upon the size of the data record being transferred. In this manner, implementations of the invention may operate to determine connectivity parameters between the devices (e.g., at least one: the available communication channels; the latency of the available communication channels; the bandwidth of the available communication channels; the security of the available communication channels), and determine to send the changed data record either directly to the second device or indirectly to the second device via the broker 50 based on the determining the connectivity parameters.

For example, when the size of the data record to be transferred at step F exceeds a threshold amount, and when there is a peer-to-peer communication channel directly between the devices 65*a* and 65*b* (e.g., Bluetooth, etc.), the broker 50 may instruct the first device 65*a* and the second device 65*b* to automatically (e.g., without user input) perform the peer-to-peer synchronization directly between the first device 65*a* and the second device 65*b* rather than using the broker 50 as a proxy as in the indirect approach. Furthermore, in addition to selecting step E or step F based on these parameters, the broker may also determine an optimal communication channel (e.g., network data, NFC, WiFi, SMS, etc.) based on the detected bandwidth/latency and the size of the data being transferred.

According to aspects of the invention, the second device 65*b* may apply its change to the changed data record after receiving the changed data record from the first device 65*a* in step F/F'. Subsequently, at step G, the second device 65*b* would push the data record (including the changes from both the first device 65*a* and the second device 65*b*) back to the master data repository 70. Furthermore, the broker 50 may be programmed to deny a request by the first device 65*a* to synchronize the data record back to the master data repository 70 after step F/F' since the second device 65*b* now controls the data record with an intent to further modify the data record. In this manner, changes to the same data record from both the first device 65*a* and the second device 65*b* are accommodated while avoiding a conflict (e.g., without a collision occurring).

In additional embodiments, in either step E or step F/F', the first device 65*a* and the second device 65*b* may send the data record back and forth between each other plural times, with each device making more than one change to the data record before the data record is finally synchronized to the master data repository 70. In this case, the broker 50 monitors each time the data record is transferred and instructs the device that last changes or possesses the data record to push the last version of the changed data record to the master data repository 70.

In accordance with further aspects of the invention, the application running on the first device 65*a* may be programmed with business rules that automatically perform one of step E and step F/F' when the communication channel(s) to perform such steps are available, e.g., since the user of the second device 65*b* is waiting on the changed data record from the first device 65*a*. The application running on the first device 65*a* may also be programmed with business rules that define a preference for one of step E and step F/F' over the other, e.g., mandate using step F when both step E and step F/F' are available.

Referring back to step D, it is possible that the first device 65*a* does not immediately receive the notification from the broker 50. For example, the first device 65*a* may not have a viable communication channel to the broker 50, e.g., the first device 65*a* may be turned off, etc. It is also possible that the first device 65*a* receives the notification, and the user of the first device 65*a* elects to not synchronize their change to the data record with either the master data repository 70 or the second device 65*b* (e.g., elects to not immediately perform step E or step F/F' after receiving the notification in step D). In both cases, the broker 50 may be programmed to initiate a 'wait period' in which the broker 50 sends a message to the second device 65*b* instructing the second device 65*b* to wait a predetermined amount of time (e.g., 10 minutes) while the broker 50 attempts to obtain the changed data record from the first device 65*a*.

During the wait period, the broker 50 may continue to send notifications to the first device 65*a* requesting that the changed data record be synchronized to either the master data repository 70 or the second device 65*b*. In embodiments, the broker 50 follows a predefined set of escalation rules that utilize different communication channels in attempting to notify the user of the first device 65*a* that their data change is required. In the event the first device 65*a* initiates step E or step F/F' during the wait period, then the wait period is terminated and the process proceeds as described above with respect to those steps. On the other hand, when the first device 65a takes no action and the wait period expires, the broker 50 discards the intended changes of the first device 65a (e.g., from step A), and permits the second device 65b to proceed with making its change to the data record. When the first device 65a comes back online, the broker 50 notifies the first device 65a that its changes have been discarded. In this manner, when the first device 65a does not take appropriate action within the wait period, the first device 65a is demoted and the second device 65b is promoted, such that the changes to the data record made by the second device 65b take precedence over those made by the first device 65a.

In further embodiments, during the wait period the broker 50 detects when one or more additional devices (e.g., third device 65n) attempt to access the same data record that is at issue between the first device 65a and the second device 65b. When the number of devices (e.g. 65b ... 65n) waiting on the first device 65a exceeds a predefined limit, the broker 50 may terminate the waiting period, discard the changes of the first device 65a (i.e., demote the first device 65a), and move to the next device in line.

The broker 50 has thus far been described as residing at the backend system, e.g., at the server 12 and not on the mobile devices 65a-n. However, it is envisioned that some or all of the functions of the broker could be performed by an application running on one or more of the mobile devices 65a-n.

Figure 3:
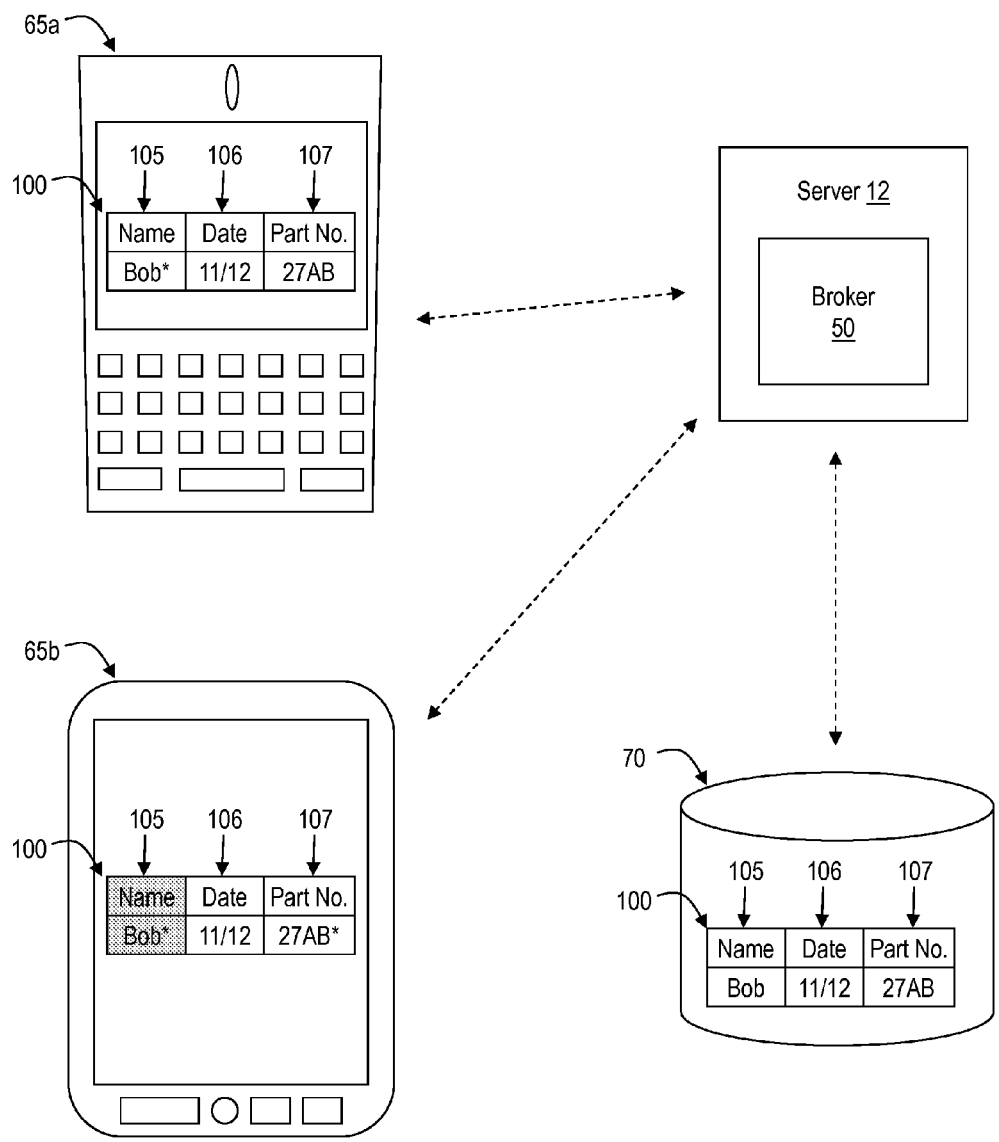
FIG. 3 shows a block diagram and exemplary operation of a system in accordance with aspects of the invention.

FIG. 3 shows an exemplary data record 100 in accordance with aspects of the invention. The data record 100 may include more than one field 105-107. A master copy of the data record 100 may be stored at the master data repository 70, and local copies of the data record 100 may be stored at the devices 65a-n. Any one of the devices 65a-n may change any one of the fields 105-107. As described above with respect to FIG. 2, a first device 65a may notify the broker 50 of a local change made to the data record 100 (e.g., change Bob to Bob*) and, subsequently, a second device 65b may also notify the broker 50 of a different local change made to the same data record 100 (e.g., change 27AB to 27AB*). In embodiments, the broker 50 manages the different changes to the data record 100 in the manner described above with respect to FIG. 2.

In embodiments, however, the broker 50 permits both the first device 65a and the second device 65b to synchronize their respective changes of the data record 100 to the master data repository 70. In particular, the broker 50 may be configured to determine whether the first device 65a and second device 65b are attempting to change the same field 105-107 of the data record, and permit both devices to synchronize to the master data repository 70 when they are not changing the same field (i.e., when they are only changing different fields). For example, the first device 65a may be changing the name field 105 and the second device 65b may be changing the part number field 107. In this case, even though both devices are changing the same data record, there is no worry of a collision since they are changing different portions of the data record. Accordingly, the broker 50 would permit both devices 65a and 65b to make their changes to the data record 100 and synchronize their respective changed data records 100 to the master data repository 70 independently of one another.

Still referring to FIG. 3, in additional embodiments, the broker 50 may visually show the user of one device the changes to the data record 100 that are being made by the user of another device, and restrict the user of the one device to only make changes to certain fields of data record 100. For example, the first device 65a may indicate to the broker 50 that it intends to change field 105 of the data record 100 (e.g., from Bob to Bob*). When the second device 65b notifies the broker 50 of its intended change to the data record 100, the broker 50 informs the second device 65b that it is only permitted to make changes to field 106 and/or 107, but not to field 105 since this portion has already been changed by the first device 65a. The broker 50 and the application running on the second device 65b may be programmed to display to the user of the second device 65b a visualization of which fields may be changed and which may not, e.g., as indicated by field 105 being grayed-out on the display of the second device 65b.

Figure 4:
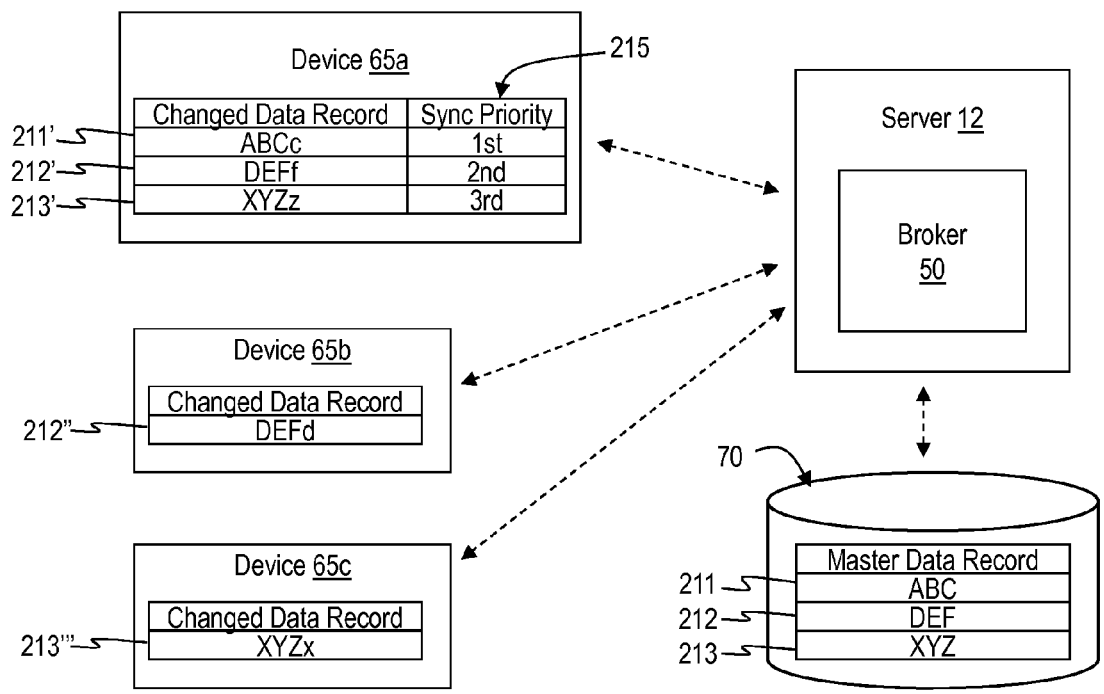
FIGS. 4 and 5 show a block diagram and exemplary operation of a system in accordance with aspects of the invention.
Figure 5:
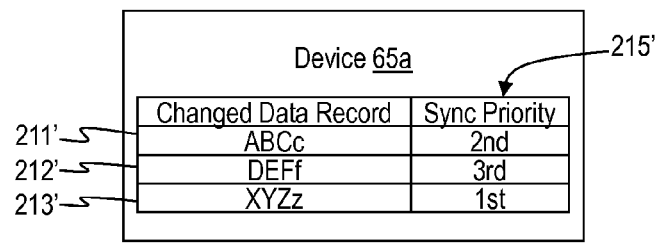

FIGS. 4 and 5 depict managing plural synchronizations in accordance with aspects of the invention. In certain cases, the master data repository 70 may have a resource limitation to process data synchronization requests from devices 65a-n. In embodiments, the broker 50 may be programmed to act as a traffic mediator and instruct each of the devices 65a-n when they should synchronize and what data they should synchronize. The broker 50 may intelligently make these decisions based on its knowledge of what data records are changed, which devices are requesting write access to dirty records, and historical information identifying which records are typically accessed by multiple devices. For example, as shown in FIG. 4, the master data repository 70 includes data records 211-213 and the first device 65a has locally changed each of the data records as indicated at 211'-213'. The synchronizations of the respective changed data records 211'-213' (e.g., from the first device 65a to the master data repository 70) are initially ranked in a priority order 215 according to enterprise rules, e.g., based on when the user of the first device 65a made the respective changes.

As also depicted in FIG. 4, the second device 65b makes a local change to data record 212", and the third device 65c makes a local change to data record 213'". In accordance with the processes described with respect to FIG. 2, the first device 65a may send its changed data record 212' to the second device 65b (e.g., as in step F), and the third device 65c may wait for the first device 65a to synchronize its changed data record 213' to the master data repository 70 (e.g., as in step E). The broker 50 recognizes that the third device 65c is waiting on the synchronization of data record 213' from the first device 65a to the master data repository 70, and also that the synchronization of data record 212' is low priority since this data record is now controlled at the second device 65b. Accordingly, as shown in FIG. 5, the broker 50 changes the priority order 215' of the synchronizations of the respective data records 211'-213' from the first device 65a to the master data repository 70, such that synchronization of the data record 213' has the highest priority (e.g., will be sent ahead of the other two) since another user is waiting on this synchronization.

Although described with respect to three devices 65a-c in FIGS. 4 and 5, it should be understood that the broker 50 can prioritize synchronizations for any number of devices 65a-n within the scope of the invention. Moreover, the broker-controlled synchronizing may be based on additional parameters, including but not limited to: how frequently a particular data record is synchronized (e.g., records that get synchronized more often and/or by more devices get ranked higher priority for syncing compared to other records); historical patterns of time and location of a device (e.g., increase the priority of a synchronization from a device when the device is approaching a known time of day and/or geo-location where syncing is not possible); etc.

Furthermore, the broker 50 may determine that a first device 65a has too low a bandwidth connection to the master data repository 70 and cannot perform a synchronization of a data record to the master data repository 70. The broker 50 may determine that a second device 65b has a high bandwidth connection to the master data repository 70, and that the first device 65a has a high bandwidth connection to the second device 65b. In this situation, the broker 50 may instruct the first device 65a to transmit their changed data record to the second device 65b, and further instruct the second device 65b to synchronize the changed data record to the master data repository 70 on behalf of the first device 65a. In this manner, the second device 65b acts as a data intermediary for the first device 65a. Alternatively to being controlled by the broker 50, this proxy-based synchronizing may be initiated by the user of the first device 65a by contacting the second device 65b and requesting that the second device 65b synchronize the data record on behalf of the first device 65a.

Figure 6:
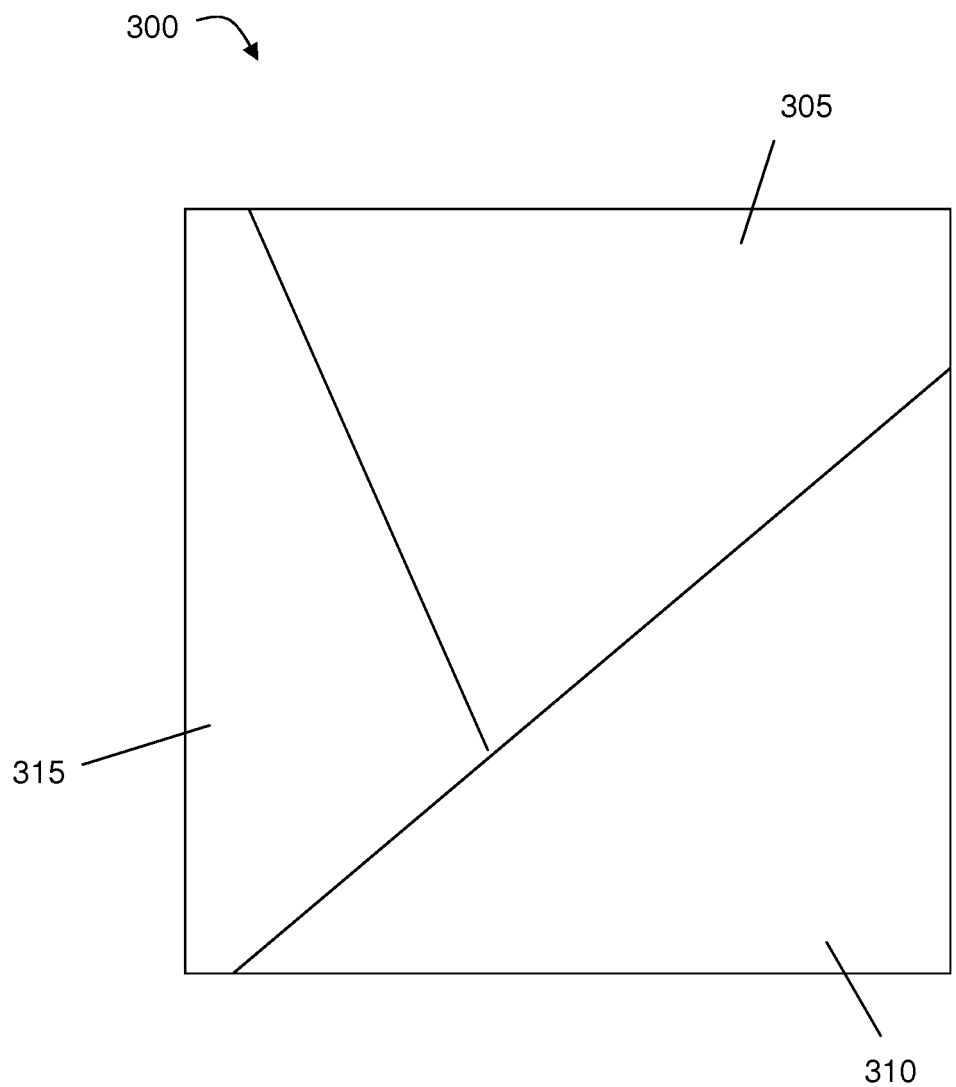
FIG. 6 depicts a predictive mapping function in accordance with aspects of the invention.

FIG. 6 illustrates a predictive-based process for managing synchronizations in accordance with aspects of the invention. In particular, FIG. 6 shows a map 300 that is built by the broker (e.g., broker 50) based on historical data from one of the devices (e.g., first device 65a). In embodiments, the map 300 includes different zones 305, 310, 315 that represent differing levels of connectivity between the device and the server (e.g., server 12). For example, zone 305 may represent a geographic area in which the device has relatively low connectivity (e.g., below average bandwidth and/or latency) to the server, zone 310 may represent a geographic area in which the device has relatively average connectivity to the server, and zone 315 may represent a geographic area in which the device has relatively high connectivity (e.g., better than average bandwidth and/or latency) to the server.

The zones 305, 310, 315 may be determined by examining historical data associated with the device, including, for example, historic geo-locations of the device when the device communicated with the server (e.g., detected by GPS, etc.) and relative connectivity at each of those geo-locations (e.g., detected by ping, etc.). A respective map 300 may be made for each one of the devices (e.g., devices 65a-n) based on the historical data for each particular device. Different devices may have different definitions of zones, e.g., based on hardware, communications signal provider, etc. For example, the same geo-location may be in a high connectivity zone for one device and a low connectivity zone for another device. The map 300 is not limited to using three zones, and any number of zones may be used within the scope of the invention.

According to aspects of the invention, the broker (e.g., broker 50) may utilize the maps 300 of plural devices (e.g., devices 65a-n) along with other data to manage when a particular device (e.g., device 65a) should perform its own synchronization with the master data repository (e.g., master data repository 70) and when the particular device should instead employ a data intermediary (e.g., device 65b) to perform a synchronization on behalf of the particular device. For example, the broker may determine the current location and direction and speed of travel of each device, e.g., based on GPS data from the devices. Furthermore, the broker may predict where each device will be at a certain time (e.g., in the future) based on the current location, direction of travel, and/or speed of travel, and at least one of: historical location data and scheduled location data. Historical location data is past geo-location data for each device that can be analyzed by the broker for patterns, e.g., device 65a is normally at location Z on Mondays at noon, etc. Scheduled location data is data regarding future locations of each device that the broker can analyze to predict where a device will be in the future, e.g., work order data with address and time of service, etc.

In embodiments, the broker uses at least one of the current location data, the historical location data, and the scheduled location data to predict where each device will be at any given time. The broker further maps these predicted locations of a device onto the map 300 for that device to predict when the device will be in a high, medium, or low connectivity zone for synchronizing of data. Based on these predictions, the broker may instruct a device to take certain action with regard to synchronizing data in accordance with enterprise rules. For example, when the broker knows that the device has a pending synchronization and that the device is about to transition from a high connectivity zone (e.g., zone 315) to a low connectivity zone (e.g., zone 305), the broker may instruct the device to perform the synchronization immediately, e.g., while still in the high connectivity zone and before entering the low connectivity zone. As another example, the broker may determine that a first device is in a low connectivity zone (for the first device) and that a second device is in a high connectivity zone (for the second device), and instruct the devices to use the second device as a data intermediary for the first device, e.g., the second device perform a synchronization on behalf of the first device. The invention is not limited to these two examples of predictive managing of synchronizations, and other predictive managing scenarios may be used within the scope of the invention.

Flow Diagrams

Figure 7:
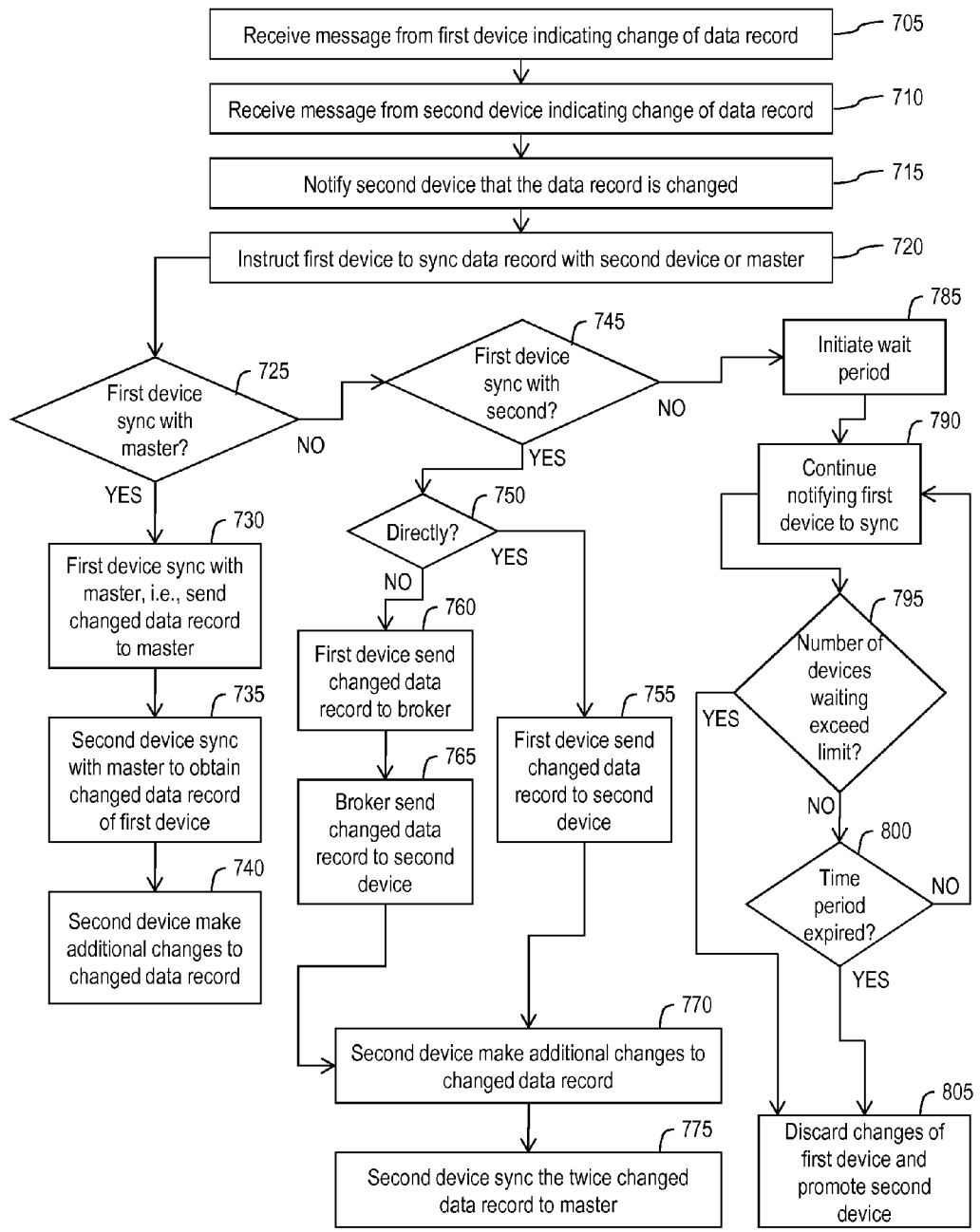
FIGS. 7 and 8 show flow diagrams implementing processes in accordance with aspects of the invention.
Figure 8:
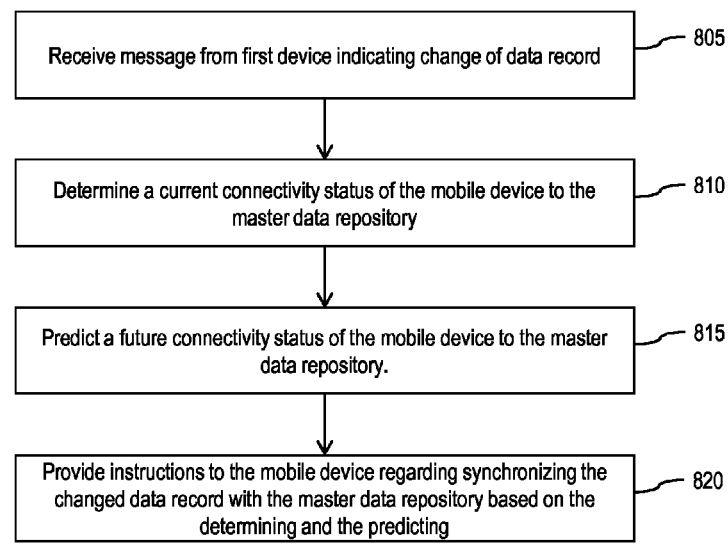

FIGS. 7 and 8 show flow diagrams implementing aspects of the present invention. The flow diagrams may equally represent a high-level block diagram or a swim-lane diagram of the invention. The steps of the flow diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1-6

FIG. 7 shows a flow diagram of steps of an exemplary process in accordance with aspects of the invention. At step 705, a first device (e.g., device 65a) notifies a broker (e.g., broker 50) that the first device has locally changed a data record. Step 705 may correspond to or be similar to step A of FIG. 2.

At step 710, a second device (e.g., device 65b) notifies the broker that the second device has locally changed a data record. Step 710 may correspond to or be similar to step B of FIG. 2.

At step 715, the broker determines that the data record indicated by the second device at step 710 is dirty, and sends a notification to the second device with this indication. This notification may include the broker instructing the user of the second device to wait before changing the data record locally at the second device. Step 715 may correspond to or be similar to step C of FIG. 2.

At step 720, the broker sends a notification to the first device instructing the first device to synchronize the data record (e.g., of step 705) with a master data repository (e.g., master data repository 70) or with the second device. Step 720 may correspond to or be similar to step D of FIG. 2.

At step 725, the first device determines whether to synchronize the data record with the master data repository. This determination may be made automatically, e.g., by the broker or by an application running on the first device, or manually, e.g., by a user of the first device via a user interface of the first device. When it is determined to synchronize the data record with the master data repository, then at step 730 the first device synchronizes the data record with the master data repository, e.g., by sending the changed data record to the master data repository. Step 730 may correspond to or be similar to step E of FIG. 2. After the first device has completed synchronizing the changed data record with the master data repository, the broker may send a message to the second device indicating that the first device has synchronized the changed data record with the master data repository and that the second device may now proceed (e.g., stop waiting as instructed previously at step 715). At step 735, the second device synchronizes with the master data repository to obtain the up-to-date version of the data record (e.g., including the changes of the first device). At step 740, the second device synchronizes its change to the data record the master data repository. After step 740, the the first device, as well as any other devices (e.g., device 65n), may refresh its client database by obtaining the changed data record from the master data repository.

At step 725, when the first device does not synchronize with the master data repository, then at step 745 the first device determines whether to synchronize the data record with the second device. This determination may be made automatically, e.g., by the broker or by the application running on the first device, or manually, e.g., by a user of the first device via a user interface of the first device. When it is determined to synchronize the data record with the second device, then at step 750 the first device determines whether to synchronize the data record directly with the second device or indirectly via the broker. This determination may be made automatically, e.g., by the broker or by the application running on the first device, or manually, e.g., by a user of the first device via a user interface of the first device. When it is determined to synchronize directly with the second device, then at step 755 the first device transmits the changed data record to the second device. Step 755 may correspond to or be similar to step F' of FIG. 2. When it is determined to synchronize indirectly with the second device via the broker, then at step 760 the first device transmits the changed data record to the broker, and at step 765 the broker transmits the changed data record to the second device. Steps 760 and 765 may correspond to or be similar to step F of FIG. 2.

At step 770, after receiving the changed data record either from the first device or from the broker, the second device makes its changes to the data record, e.g., on top of the changes made by the first device. At step 775, the second device synchronizes the changed data record (e.g., as changed by both the first device and the second device) to the master data repository. Step 775 may correspond to or be similar to step G of FIG. 2. After the second device synchronizes the data record to the master data repository at step 775, any device is free to refresh their client database with the changed data record from the master data repository.

At step 745, when the first device does not synchronize with the second device, then at step 785 the broker initiates a wait period. In embodiments, step 785 comprises the broker instructing the second device to wait a predetermined amount of time while the broker attempts to obtain the changed data record from the first device. At step 790, the broker continues its attempts to contact the first device in order to obtain the data record from the first device. In embodiments, step 790 includes following a defined set of escalation rules that utilize various communication channels to attempt to notify the user of the first device that their data change is required by other users.

The broker monitors whether other devices ask for the same data record during the wait period. At step 795, the broker determines whether the number of users waiting for this data record exceeds a predefined limit. If the number of users waiting does not exceed the limit, then at step 800 the broker determines whether the time period (e.g. initiated at step 785) has expired. If the time period has not expired, then the process returns to step 790. On the other hand, if the number of users waiting exceeds the limit at step 795, or if the time period has expired at step 800, then the process proceeds to step 805, where the broker discards the changes of the first device and promotes the second device to the primary position with regard to this data record. At any time after step 785 and before step 805, the first device may undertake to synchronize the data record with either the master data repository or the second device during the wait period, at which point the process goes to one of step 730 and step 750.

FIG. 8 shows a flow diagram of steps of an exemplary process in accordance with aspects of the invention. At step 805, a mobile device (e.g., device 65a) notifies a broker (e.g., broker 50) that the first device has changed a data record locally in it client database. Step 805 thus includes the broker receiving a notification from the mobile device that a data record has been changed on the mobile device. At step 810, the broker determines a current connectivity status of the mobile device to the master data repository. The connectivity status may be based on the map (e.g., map 300) for the mobile device, and may be, for example, that the mobile device is in one of a low connectivity zone (e.g., zone 305), a medium connectivity zone (e.g., zone 310), and a high connectivity zone (e.g., zone 315).

At step 815, the broker predicts a future connectivity status of the mobile device to the master data repository. The predicting may be based on the map and at least one of current location data, historical location data, the scheduled location data (e.g., as described with respect to FIG. 6). The future connectivity status may be, for example, that the mobile device will be in one of a low connectivity zone (e.g., zone 305), a medium connectivity zone (e.g., zone 310), and a high connectivity zone (e.g., zone 315), at a particular time in the future. At step 820, the broker provides instructions to the mobile device regarding synchronizing the changed data record with the master data repository based on the determining and the predicting. This may entail, for example, sending a message to the mobile device instructing the mobile device to utilize a second mobile device as a data intermediary for synchronizing the changed data record with the master data repository. Additionally, this may involve, for example, sending a message to the mobile device instructing the mobile device to perform the synchronizing at a particular time.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method of data synchronization, comprising:
storing a data record in a master data repository, a first device and a second device, wherein the master data repository, the first device and the second device are coupled to a server comprised of a processor and a memory;
receiving, by the server, a first notification from the first device that the data record has been changed to include first changes on the first device;
receiving, by the server, a second notification from the second device of an intent to change the data record to include second changes on the second device;
instructing, by the server, the second device to wait before changing the data record on the second device;
instructing, by the server, the first device to synchronize the changed data record, wherein the synchronizing comprises the first device sending the changed data record, with the first changes, to one of the master data repository and the second device; and
upon determining that the first device is instructed by the server to send the data record with the first changes to the second device rather than the master data repository, instructing, by the server, the second device to:
change the data record on the second device to include the first changes from the first device and the second changes from the second device to create a twice changed data record; and
synchronize the twice changed data record on the second device to the master data repository,
wherein the first device comprises a first mobile computing device, the second device comprises a second mobile computing device, and the server comprises a server computing device,
wherein the instructing the first device to synchronize the changed data record comprises instructing the first device to synchronize the changed data record to the master data repository.

2. The method of claim 1, further comprising instructing the second device to obtain the changed data record from the master data repository after the first device has synchronized the changed data record to the master data repository.

3. The method of claim 1, further comprising initiating a wait period for changing the data record on the second device based on the first device failing to synchronize the changed data.

4. The method of claim 3, further comprising:
monitoring a number of devices waiting to access the data record during the wait period; and
discarding the changed data record and demoting the first device based on the number of devices exceeding a predefined limit.

5. The method of claim 3, further comprising discarding the changed data record and demoting the first device based on the wait period expiring.

6. The method of claim 3, further comprising sending instructions to synchronize to the first device using different communication channels during the wait period.

7. The method of claim 1, further comprising providing to the second device a visual indication of which fields of the changed data record are permitted to be changed by the second device.

8. The method of claim 1, wherein the steps of claim 1 are performed by a broker of a synchronization server associated with the master data repository.

9. The method of claim 1, wherein the steps of claim 1 are implemented in a computer infrastructure having computer executable code tangibly embodied on a non-transitory computer readable storage medium having programming instructions to perform the steps of claim 1.

10. A system for managing data synchronization, comprising:
a synchronization server including a processor and a memory, and further comprising a broker that executes instructions to perform:
storing a data record in a master data repository, a first device and a second device, wherein the master data repository, the first device and the second device are coupled to the synchronization server;
receiving a first notification from the first device that the data record has been changed to include first changes on the first device;
receiving a second notification from a second device of an intent to change the data record to include second changes on the second device;
sending a message to the second device to wait before changing the data record on the second device;
sending a message to the first device to synchronize the changed data record with the first changes to one of a master data repository and the second device; and
upon determining that the first device is instructed by the server to synchronize the data record with the first changes to the second device rather than the master data repository, instructing, by the server, the first and second devices to:
transmit the data record with the first changes from the first device to the second device;
change the data record on the second device to include the first changes from the first device and the second changes from the second device to create a twice changed data record; and
synchronize the twice changed data record on the second device to the master data repository,
wherein the sending the message to the first device to synchronize the changed data record comprises instructing the first device to synchronize the changed data record to the master data repository.

11. The system of claim 10, wherein the first device and the second device comprise mobile computing devices that are intermittently connected to the master data repository.

12. The system of claim 11, wherein:
the master data repository comprises a server database that contains a copy of the data record; and the first device and the second device each comprises a client database that contains a copy of the data record.

13. The system of claim 10, wherein the instructing the first device to synchronize the changed data record comprises instructing the first device to use the second device as a data intermediary for sending the changed data record to the master data repository.

14. A computer system for managing data synchronization, the system comprising:
- a CPU, a computer readable memory, and a computer readable storage media;
- first program instructions to monitor a change of a data record in a client database of a first mobile device; and
- second program instructions to, based on the monitoring, instruct the first device to transmit the change of the data record to one of a master data repository and a second mobile device, wherein the master data repository includes a server database that includes the data record, and the second mobile device includes another client database that includes the data record;
- third program instructions to, upon determining that the first mobile device is instructed to transmit the change of the data record to the second mobile device rather than the master data repository, instruct the second mobile device to change the data record on the second mobile device to include the change of the data record from the first mobile device and any changes to the data record from the second mobile device to create a twice changed data record, and synchronize the twice changed data record on the second mobile device to the master data repository,
- wherein the first, second and third program instructions are stored on the computer readable storage media for execution by the CPU via the computer readable memory, and
- wherein the instructing the first device to transmit the change of the data record comprises instructing the first device to synchronize the change of the data record to the master data repository.

15. The computer system of claim 14, further comprising third program instructions to: determine connectivity parameters between the first mobile device, the second mobile device, and a broker; and based on the determining, instruct the first mobile device to transmit the change of the data record either directly to the second mobile device or indirectly to the second mobile device via the broker.

16. A method of managing data synchronization between a mobile device and a master data repository using a server comprised of a processor and a memory coupled to the master data repository and the mobile device, comprising:
- receiving a notification from the mobile device that a data record has been changed to include first changes in a client database on the mobile device;
- determining a current connectivity status of the mobile device to the master data repository having a server database that includes the data record, wherein the determining of the current connectivity status is based on a connectivity map that indicates whether the mobile device is currently in a low connectivity zone, a medium connectivity zone or a high connectivity zone;
- predicting a future connectivity status of the mobile device to the master data repository, wherein the predicting is based on a map and at least one of current location data, historical location data, and scheduled location data of the mobile device; and
- providing instructions to the mobile device regarding synchronizing the changed data record with the master data repository based on the determining of the current connectivity status and the predicting of the future connectivity status,
- wherein the providing instructions comprises instructing the mobile device to utilize a second mobile device as a data intermediary for synchronizing the changed data record with the master data repository, and providing instructions for changing the data record on the second device to include the first changes from the first device and any second changes from the second device to create a twice changed data record, and synchronizing the twice changed data record on the second device to the master data repository.

17. The method of claim 16, wherein the providing instructions comprises instructing the mobile device to perform the synchronizing at a particular time.

* * * * *